J. DUQUETTE.
STARTING DEVICE FOR ENGINES.
APPLICATION FILED JUNE 2, 1919.
1,356,856.
Patented Oct. 26, 1920.
2 SHEETS—SHEET 1.
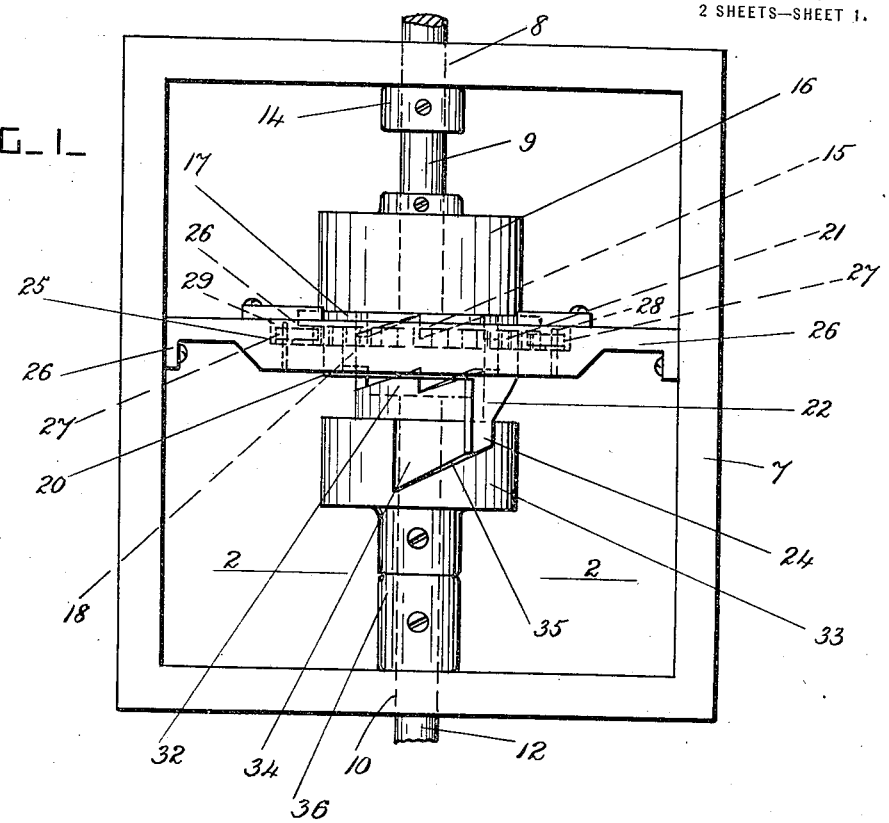
FIG_1_
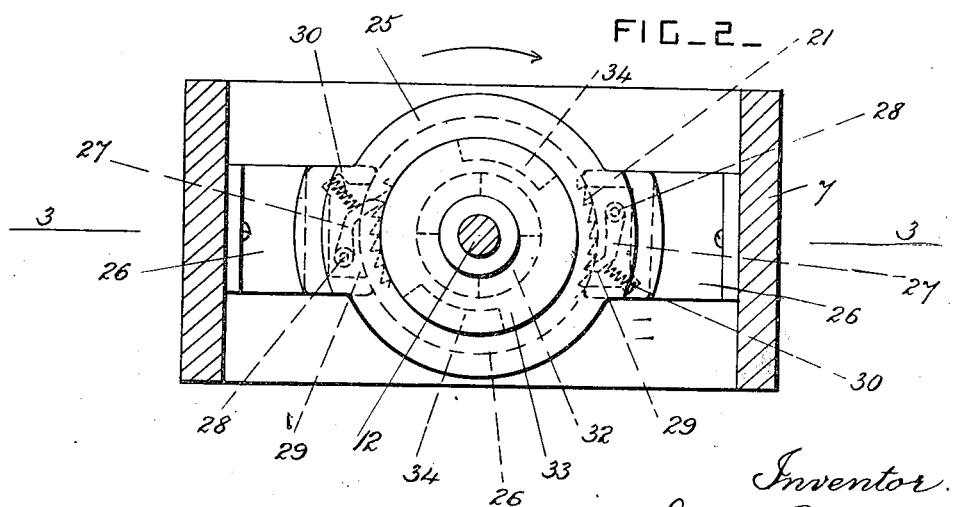
FIG_2_
Inventor.
Julien Duquette.
by Herbert W. Jenner.
Attorney J. DUQUETTE.
STARTING DEVICE FOR ENGINES.
APPLICATION FILED JUNE 2, 1919.
1,356,856.
Patented Oct. 26, 1920.
2 SHEETS—SHEET 2.
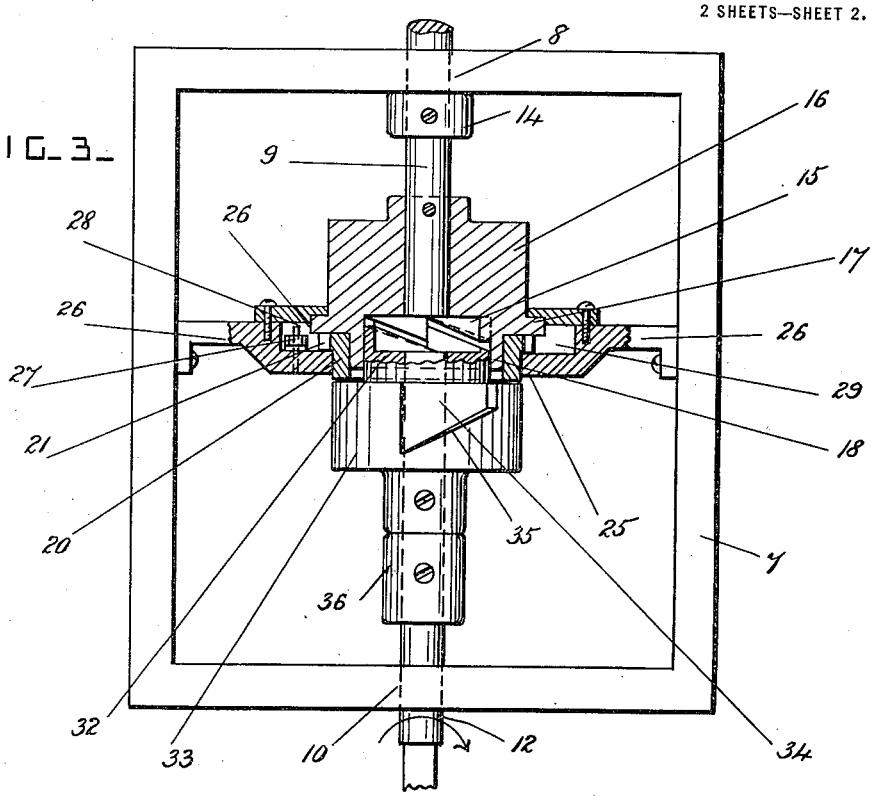
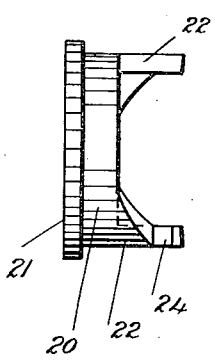
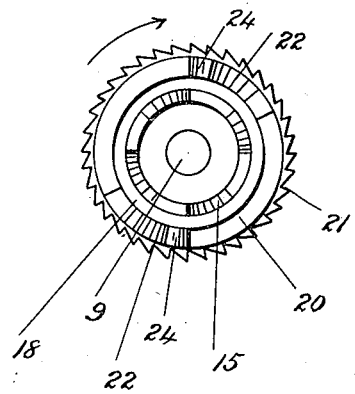
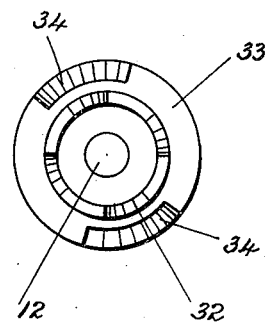
Inventor.
Julien Duquette
by Herbert W. Jenner.
Attorney.

UNITED STATES PATENT OFFICE.

JULIEN DUQUETTE, OF SPRINGFIELD, MASSACHUSETTS.

STARTING DEVICE FOR ENGINES.

1,356,856. Specification of Letters Patent. Patented Oct. 26, 1920.

Application filed June 2, 1919. Serial No. 301,189.

*To all whom it may concern:*

Be it known that I, JULIEN DUQUETTE, a citizen of the United States, residing at Springfield, in the county of Hampden and State of Massachusetts, have invented certain new and useful Improvements in Starting Devices for Engines, of which the following is a specification.

This invention relates to devices for starting internal combustion engines such as used on motor cars; and it consists in the novel construction and combination of the parts hereinafter fully described and claimed whereby the danger of accidents to the persons who undertake to start the engine, by cranking it, is obviated.

In the drawings, Figure 1 is a plan view of a starting device constructed according to this invention, and showing its main clutches disengaged. Fig. 2 is a front view of the device showing the starting shaft in cross-section on the line 2—2 in Fig. 1. Fig. 3 is a sectional plan view, taken on the line 3—3 in Fig. 2, and showing the main clutches engaged for starting the engine. Fig. 4 is a detail view of the disengaging clutch teeth and the ratchet toothed wheel. Fig. 5 is a front view of the same, showing also the main clutch member on the engine shaft. Fig. 6 is a rear view of the clutch members on the starting shaft.

A frame 7 is provided of any suitable construction for supporting the parts, and it has a bearing 8 in which the engine shaft 9 is journaled, and a bearing 10 in which the starting shaft 12 is journaled. These two shafts 9 and 12 are arranged in line with each other. The engine shaft is prevented from sliding backwardly in its bearing by means of a collar 14, and a main toothed clutch member 15 is secured on its front end portion. The teeth of this main clutch member have radial faces and inclined flanks, like the teeth of a ratchet wheel.

The clutch member 15 is formed on a belt pulley or cylinder 16 which may be used for driving a fan or for any other purpose, and this cylinder has a circumferential rib 17 at its front side, and an annular bearing 18 which projects forwardly of and around the toothed clutch member 15.

A sleeve 20 is journaled loosely on the annular bearing 18, and is provided with a ratchet toothed wheel 21 at its rear part, and two long forwardly projecting clutch teeth 22 at its front part. The clutch teeth 22 are also ratchet shaped teeth, and they have stops 24 at their front ends or points.

The sleeve 20 is journaled on the bearing 18 and in a housing or stationary support 25, which has also a bearing 26 in which the rib 17 is journaled. This housing overlaps the teeth of the ratchet wheel 21 and preserves them from injury. The housing or support 25 is secured to the supporting frame 7 by arms 26, or in any other approved manner. Two similar pawls 27 are pivoted on pins 28 in recesses 29 in the housing, and these pawls engage with the teeth of the ratchet wheel 21 and permit it to revolve in the direction of the curved arrow, but not in the reverse direction.

Two pawls are preferably provided, but more or less than two pawls might be used. The pawls are held in engagement with the teeth by springs 30.

The starting shaft 12 has a main toothed clutch member 32 secured on its front end portion, and adapted to slide inside the bearing 18 and engage with the main toothed clutch member 15 when slid rearwardly. The clutch member 32 projects from a cylinder 33 which has clutch recesses 34 in its periphery for the teeth 22 and their stops 24 to engage with.

These recesses 34 have parallel ends arranged longitudinally of the starting shaft, and have inclined front sides 35 arranged diagonally of the starting shaft. The starting shaft is slidable longitudinally in its bearing 10, and it has a collar 36 secured on it to limit its forward travel. A starting crank, not shown, of any approved sort is secured on the front end portion of the shaft 12 in front of its bearing 10.

When the engine is to be started, the starting shaft is revolved by hand in the direction of the curved arrow, after being slid rearwardly so that the teeth of the main clutch members 15 and 32 are in engagement with each other. The starting shaft revolves the engine shaft, and as soon as the engine commences to work the engine shaft is revolved rapidly, and the inclined flanks of the teeth of the main clutch member 15 push the clutch member 32 forwardly so that the two main clutch members are disengaged automatically. The clutch teeth 22 are much longer than the teeth of the main clutch members, and after the engine has been started the starting shaft is revolved backwardly by hand until prevented by the stops 24 which strike the shorter ends of the recesses 34. The inclined front sides 35 of the clutch recesses bear against the inclined parts of the stops so that the starting shaft is slid forwardly, and the main clutch members are placed at a safe distance from each other.

When the engine is being started the ratchet toothed wheel 21 is revolved by the long clutch teeth 22, and this ratchet wheel 21 and its pawls prevent the starting shaft and its crank from being revolved in the reverse direction until the two main clutch members have been slid out of engagement with each other.

When a back fire takes place, the ratchet toothed wheel 21 is held from revolving, in the reverse direction to the arrow in Fig. 2, by the pawls 27. The engine itself turns the shaft 9 in the direction of the arrow so that the inclined teeth of clutch member 15 push the teeth of clutch member 32 forwardly out of engagement with the clutch member 15. This disengages the engine shaft 9 from the starting shaft 12. The inclined teeth or sides 35 of the recesses 34 are deeper than the teeth of the clutch members 15 and 32 so that a safety clearance is provided which will allow the starting shaft to turn backward about one-eighth of a revolution and then the stops 24 limit the movement.

A starting device constructed in this manner greatly reduces the chances of accidents in cranking up the engine of a motor car. Such accidents are liable to break the arm of the person who attempts to start the engine with the devices commonly used for that purpose.

What I claim is:

1. In an engine starter, an engine shaft, a toothed clutch member secured thereon, a slidable starting shaft, a toothed clutch member secured on the starting shaft and adapted to engage with the aforesaid clutch member, a cylinder secured to the slidable clutch member and provided with clutch tooth recesses of greater depth than the teeth of the said clutch members, a non-slidable wheel mounted concentric with the said clutch members and provided with relatively long clutch teeth which slide to a limited extent circumferentially and longitudinally in the said recesses, and means for preventing the said wheel from revolving backwardly of the normal direction of revolution of the engine shaft.

2. In an engine starter, an engine shaft, a clutch member secured on the engine shaft and provided with an annular bearing, a slidable starting shaft, a clutch member secured on the starting shaft and slidable inside the said annular bearing into and out of engagement with the aforesaid clutch member, a non-slidable ratchet toothed wheel journaled on the annular bearing and provided with means for preventing it from revolving backwardly, a cylinder secured to the slidable clutch member and provided with clutch tooth recesses of greater depth than the teeth of the said clutches, and relatively long clutch teeth projecting from the said ratchet wheel and sliding to a limited extent circumferentially and longitudinally in the said recesses.

3. In an engine starter, an engine shaft, a clutch member secured on the engine shaft, a slidable starting shaft, a clutch member secured on the starting shaft and engaging with the aforesaid clutch member, a stationary support, a ratchet wheel mounted to revolve concentric with the said shafts, a pawl carried by the said support and engaging with the said wheel, a cylinder secured to the slidable clutch member and provided with clutch tooth recesses, and relatively long clutch teeth projecting from the said ratchet wheel and working in the said recesses, said clutch teeth being provided with stops at their points which engage with the ends of the said recesses and limit the circumferential movements of the said teeth in the recesses.

4. In an engine starter, an engine shaft, a clutch member secured on the engine shaft and provided with an annular bearing and a circumferential rib, a clutch member secured on the starting shaft and slidable inside the said annular bearing and engaging with the aforesaid clutch member, a stationary housing encircling the said rib, a ratchet toothed wheel journaled in the housing on the said annular bearing, a pawl carried by the said housing and engaging with the ratchet toothed wheel, a cylinder secured to the slidable clutch member and provided with clutch tooth recesses, and relatively long clutch teeth projecting from the ratchet toothed wheel and working in the said recesses.

In testimony whereof I have affixed my signature.

JULIEN DUQUETTE.